INVENTORS
JOHN B. GUNN

BY Bernard N. Wiener
ATTORNEY

United States Patent Office 3,452,221

Patented June 24, 1969

3,452,221

ELECTRICAL SHOCK WAVE (GUNN EFFECT) LOGICAL APPARATUS

John B. Gunn, Mount Kisco, N.Y., assignor to International Business Machines Corporation, Armonk, N.Y., a corporation of New York Filed July 13, 1966, Ser. No. 564,895

Int. Cl. H03k *19/08*

U.S. Cl. 307—299 3 Claims

ABSTRACT OF THE DISCLOSURE

The shock wave apparatus includes two electric shock wave devices which are connected in parallel circuit relationship with respect to a voltage supply. Each device has an anode, cathode and a trigger input terminal. A domain is nucleated in either device by the application of a pulse to the trigger terminal which adds to the voltage of the supply source to cause the domain threshold to be exceeded. The two devices are connected by a tightly coupled inductive circuit. When a domain is nucleated in one device, the voltage across that device is raised. This inductive circuit lowers the voltage across the other device so that it is no longer responsive to the application of signals to the input trigger terminal on that device.

This invention relates generally to electrical shock wave devices and it relates more particularly to a plurality of such devices interconnected to provide logical signals.

The prior art electrical shock wave device includes a monocrystalline compound semiconductor region, e.g., n-type GaAs or InP. If an electric field having a magnitude above a particular threshold value is applied across the crystalline region, a current fluctuation is produced in an associated load circuit. The current fluctuation originates from a localized space charge distribution or domain of hot electrons that is nucleated in the crystal at or near the cathode, propagates in the crystalline region, and is extinguished at or near the anode. In order for the localized space charge distribution to occur in the semiconductor region, there must be present therein both a sufficient density of conduction electrons and an inhomogeneity in the electric field gradient. The normal density, i.e., the equilibrium density of conduction electrons in the simconductor region, is descriptive of the n-type charge carriers available for current at a particular temperature due to the crystalline structure and dopant concentration.

The original electrical shock wave device is presented in copending U.S. patent application S.N. 374,758, filed June 12, 1964, now Patent No. 3,365,583 by John B. Gunn, and assigned to the assignee hereof. It is a continuation-in-part of U.S. patent application S.N. 286,700, filed June 10, 1963, and now abandoned. An explanation of electrical shock wave propagation in a semiconductor crystalline region described in terms of nucleation, propagation, and extinction of domains is presented in U.S. patent application S.N. 524,406, filed Feb. 2, 1966 by John B. Gunn, and assigned to the assignee hereof. Heretofore, the use of electrical shock wave devices for providing logical signals has been somewhat limited because electrical shock wave propagation always occurs with the application of a threshold level voltage. When electrical shock wave devices are used for logical purpose, it is desirable that the nucleation, propagation and extinction of a domain in an electrical shock wave device crystalline region be controllably related to applied logic pulses.

It is an object of this invention to provide an electrical shock wave apparatus which produces logical signals through predetermined control of nucleation, propagation and extinction of hot electron domains, i.e., electrical shock waves, in semiconductor regions.

It is another object of this invention to provide an electrical shock wave apparatus wherein a plurality of electrical shock wave devices are inductively interconnected so that propagation of electrical shock waves in a group thereof precludes propagation of electrical shock waves in another group thereof.

It is another object of this invention to provide a two-state device having two electrical shock wave devices interconnected such that when nucleation or propagation of an electrical shock wave occurs in one device the other device is inhibited therefor.

It is another object of this invention to provide apparatus which produces a logical signal for a predetermined interval subsequent to the application of an input pulse on one input terminal. The logical signal continues to exist regardless of whether another input pulse is present on another terminal during the time interval of said output signal. If the latter input signal occurs subsequent to the first output signal, but before the next input pulse for the first input terminal, another similar output signal appears on another output terminal.

Broadly, this invention provides apparatus for producing logical signals wherein input pulses control the initiation of output signals with durations dependent on the nature of a respective electrical shock wave device. The input pulses effect the generation of electrical shock waves in electrical shock devices which are manifested as the output logical signals. In the apparatus there is a plurality of coupled electrical shock wave devices, e.g., the devices are inductively coupled. An input pulse applied to the crystalline electrical shock wave device initiates the nucleation of a domain which subsequently propagates in the crystalline region and is ultimately extinguished. Upon the nucleation of a domain in the apparatus, there is a change in voltage at an output terminal of the device and a change in the current which flows in the device. The coupling between one group of the devices inhibits another group of the devices from producing electrical shock waves. In certain embodiments of this invention where two electrical shock wave devices are inductively coupled, when the nucleation or propagation of a domain occurs in one of the electrical shock wave devices, the nucleation or propagation of a domain in the other device is precluded.

The foregoing and other objects, features and advantages of the invention will be apparent from the following more particular description of preferred embodiments of the invention, as illustrated in the accompanying drawings.

Figure 1:
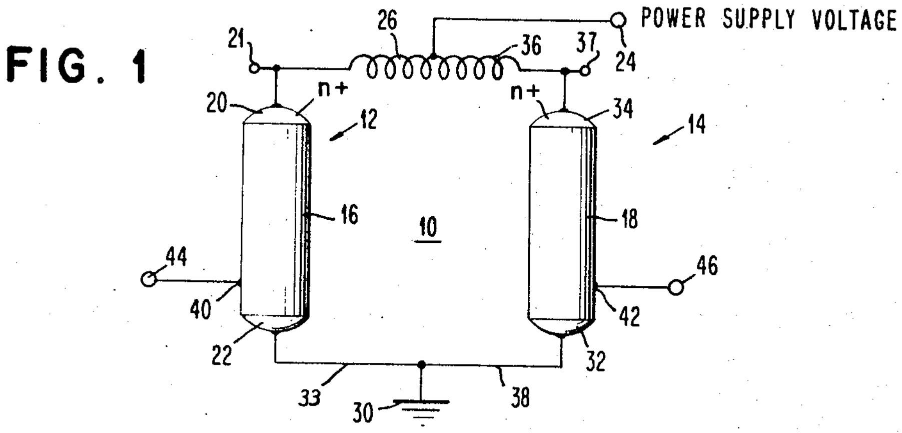
FIG. 1 is a schematic circuit diagram of an embodiment of the invention showing two electrical shock wave devices incorporated in inductively coupled relationship.
Figure 3:
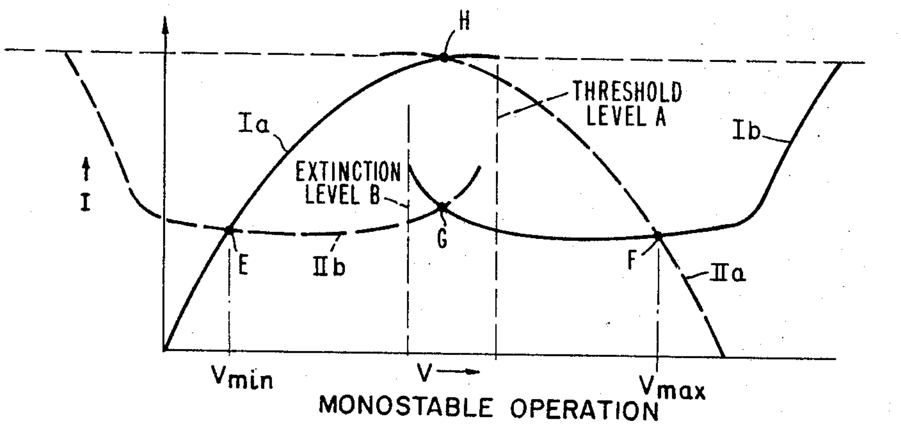

FIG. 3 presents current versus voltage curves for each of the electrical shock wave devices of the embodiment of FIG. 1 for monostable operation thereof.

Figure 4:
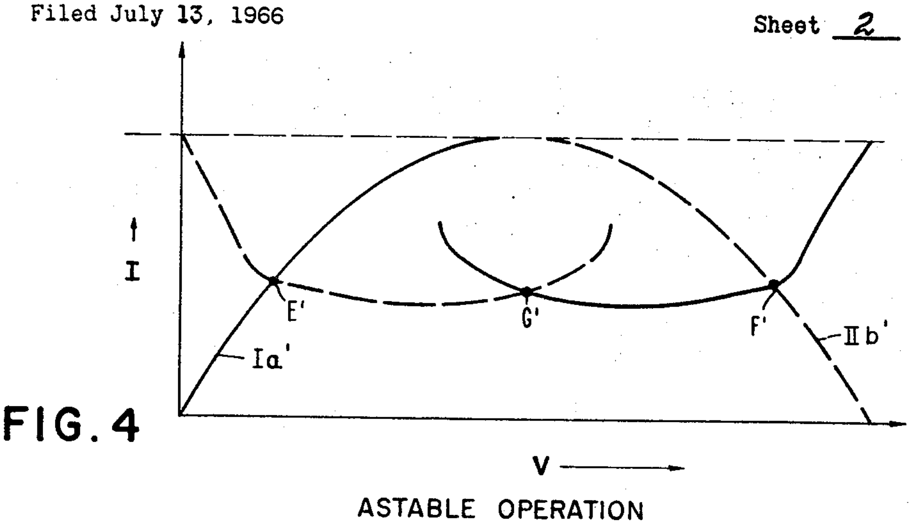

FIG. 4 presents current versus voltage curves similar for astable operation of the embodiment of FIG. 1.

Figure 5:
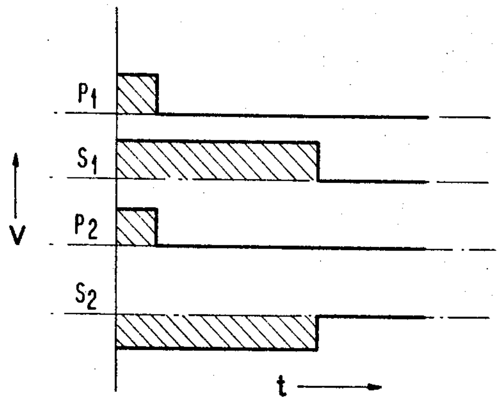

FIG. 5 is a timing diagram illustrating the relationships among input pulses and output signals for an embodiment of the invention.

Figure 6:
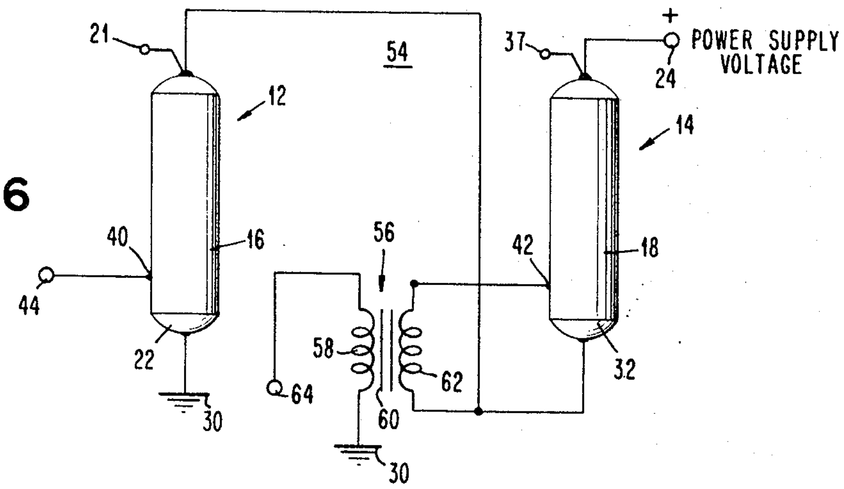

FIG. 6 is another embodiment of this invention illustrating a two-state electrical shock wave apparatus comprised of two electrical shock wave devices in a series configuration.

Figure 7:
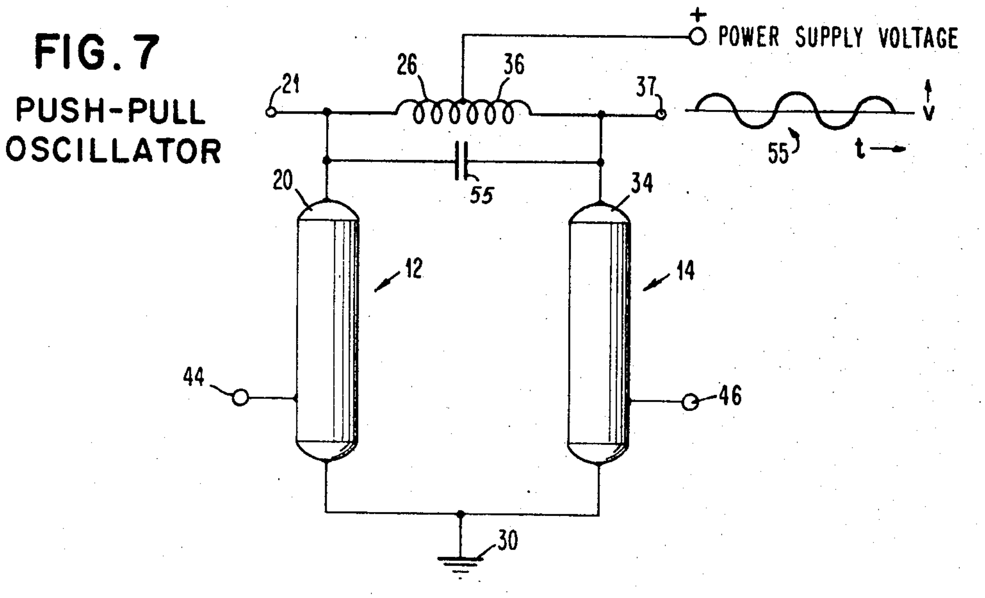
Figure 8:
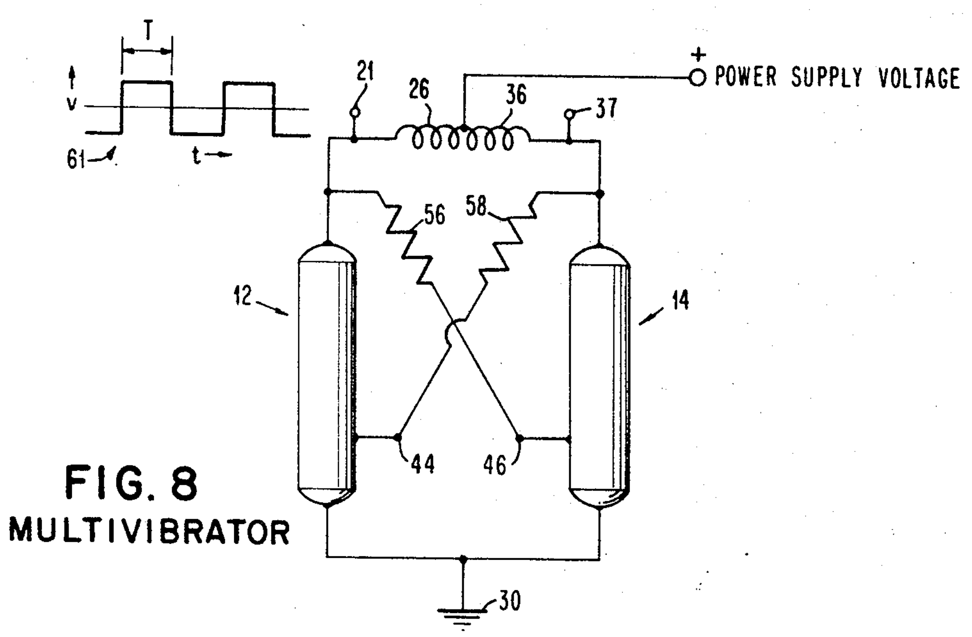

FIGS. 7 and 8 are embodiments of this invention illustrating a push-pull oscillator and a cross-coupled oscillator in accordance with the principles of this invention.

An embodiment 10 of this invention is presented in FIG. 1 whose nature and operation will be described with reference to FIGS. 2 to 4 which are an exemplary applied voltage pulse and current-voltage characteristics for monostable and astable operation of the embodiment 10 of FIG. 1.

The embodiment 10 consists of electrical shock wave devices 12 and 14 each with a semiconductor crystalline region 16 and 18, respectively. Semiconductor region 16 has sufficient density of conduction electrons to permit domain nucleation and propagation under influence of an applied electric field of sufficient intensity. Ohmic contacts 20 and 22 on the opposite ends of region 16 are connected to a positive voltage supply 24 via inductor 26 and to ground 30 via conductor 33. Semiconductor region 18 of device 14 has ohmic contacts 32 and 34 on its opposite ends which are connected respectively to positive voltage supply 24 via inductor 36 and to ground 30 via conductor 38. The inductors 26 and 36 are tightly coupled. The number of turns in each inductor is adjusted in accordance with the length and cross-sectional area of devices 12 and 14. Semiconductor devices 16 and 18 have contacts 40 and 42 thereon to which voltage levels may be applied via trigger terminals 44 and 46, respectively.

In operation, when a voltage pulse 48 is applied across a semiconductor device 16 or 18, several operational conditions are possible dependent upon the value of the applied potential. Illustratively, in the absence of another controlling condition, if the voltage pulse 48 across semiconductor region 16 exceeds in value the threshold level A, there occurs nucleation of a domain at cathode 22 which propagates toward anode 20 and is ultimately extinguished thereat and is followed by nucleation of a successive domain with its attendant propagation and ultimate extinction in infinite sequence. If the level of pulse 48 falls below threshold level A during propagation of a domain in semiconductor region 16 but is maintained above extinction level B, the domain once nucleated continues to propagate until extinguished at the anode 20. However, if the voltage level is established below threshold level A, another domain is not nucleated at the cathode.

Figure 2:
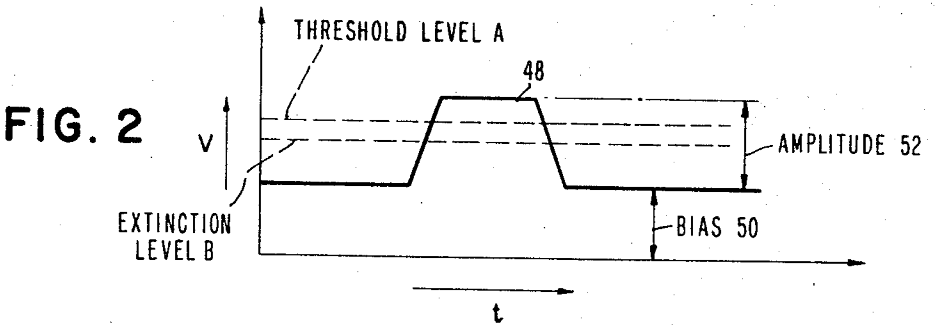
FIG. 2 illustrates several operational characteristics of a voltage pulse for application across an electrical shock wave device.

FIGURE 2 illustrates other parameters of the voltage pulse 48 which are characteristic for an operation of the electrical shock wave device 16 considered in isolation from the rest of the present embodiment circuitry. If a bias level 50 is present across semiconductor region 16, the voltage pulse 48 need rise only until the sum of the bias and pulse level attain the required value. Further, the voltage pulse 48 has an amplitude 52 which characterizes certain current and voltage parameters for operation of the electrical shock wave device 16.

Electrical shock wave devices 16 and 18 of embodiment 10 have a particular current-voltage characteristic which determines the operating conditions for the embodiment 10. Curve I in FIG. 3 with two branches, I*a* and I*b*, is characteristic of the operation of electrical shock wave device 16; and curve II, with branches II*a* and II*b* is characteristic of the operation of electrical shock wave device 18. Operating points for the embodiment 14 of FIG. 1 are at the intersections of curves I and II. For an applied voltage at terminal 24 which maintains a steady state potential across devices 12 and 14 greater than extinction level B and less than threshold level A of FIG. 2, the operation of embodiment 10 is monostable in which common points E and F are stable while a domain is propagating. While a domain exists within region 16 or 18, common point G is always unstable and common point H is always stable.

The current-voltage characteristics of FIG. 4 exemplify operation of embodiment 10 when the voltage level at terminal 24 is above the threshold level A thereby providing astable operation. The several curves and operating conditions presented in FIG. 4 utilize the same letters as in FIG. 3 but are signified by primes. Under the operational conditions of FIG. 4 for the embodiment 10 of FIG. 1, common points E′ and F′ are stable operating points while a domain exists in either electrical shock wave device 12 or electrical shock wave device 14, and common point G′ is always unstable.

With reference to the current-voltage characteristics shown in FIG. 3, when the applied voltage across semiconductor region 16 of the embodiment 10 of FIG. 1 exceeds the threshold level A, a domain is nucleated at cathode 22 and propagates toward anode 20. The lower branch I*b* represents the series combination of the semiconductor region 16 resistance combined with the negative resistance of the traveling domain. A reversion to the upper branch I*a* occurs when the domain reaches the anode if the instantaneous voltage exceeds $V_{max}$ or if the unstable voltage falls below $V_{min}$.

FIG. 5 is a timing diagram presenting input pulses $P_1$ and $P_2$ and output signals $S_1$ and $S_2$ suitable for explaining the operation of embodiment 10 of FIG. 1. Illustratively, with a voltage applied by voltage supply, having a magnitude at least equal to extinction level B of FIG. 2, but less than the threshold level A, electrical shock wave propagation does not occur in either electrical shock wave device 12, or electrical shock wave device 14. Input pulses $P_1$ and $P_2$ applied to input trigger terminals 44 and 46, respectively, have magnitudes such that their contribution to the applied field existing in each device raises the total field in device 12 or 14 above the value required to initiate electrical shock wave propagation therein. When an input pulse $P_1$ is applied to input trigger terminal 44 of device 12, a shock wave is nucleated at cathode 22, which propagates toward anode 20. During the interval that electrical shock wave propagation is occurring in device 12, application of an input pulse $P_2$ to input terminal 46 of device 14 does not cause electrical shock wave propagation therein because the voltage across that device is below extinction level B. The application of an input pulse $P_1$ to terminal 44 causes a voltage signal $S_1$ to be presented to output terminal 21, whose duration is determined by the propagation time of the nucleated domain from the cathode 22 to anode 20. Because of the inductive tight coupling between inductance 26 and inductance 36, there is an equal and opposite voltage signal $S_2$ presented at output terminal 37 connected to anode 34 of device 14. As output signal $S_2$ is negative during the interval of propagation of electrical shock wave in device 12, the voltage applied across device 14 is below the extinction level B. Accordingly, application of an input pulse $P_2$ to input terminal 46 of device 14 during the interval that electrical shock wave propagation is occurring in device 12 cannot effect the nucleation of a domain in device 14. Reciprocally, if an input pulse $P_2$ is applied to input terminal 46 of device 14 when no electrical shock wave propagation is occurring in device 12, the operational circumstances described above occur initially with respect to device 14, i.e., a positive signal is presented to the output termnal 37 and a negative voltage signal is presented to output terminal 21.

Another embodiment 54 of this invention is presented in FIG. 6, which is characterized by electrical shock wave devices 12 and 14 being connected in a series arrangement. Similar aspects of the embodiment 10 of FIG. 1 and the embodiment 54 of FIG. 6 are numbered identically. In contrast to the autotransformer coupling between devices 12 and 14 of embodiment 10 of FIG. 1, there is a direct coupling between devices 12 and 14 in embodiment 54 of FIG. 6. To provide isolation of an input pulse applied to trigger device 14, a transformer 56 is included. Transformer 56 has input winding 58, core 60 and output winding 62. Input pulses to trigger device 14 are applied to terminal 64 of transformer winding 58. The operation of the embodiment 54 is analogous to that described above for the embodiment 10 of FIG. 1, except that input pulses for device 14 are applied to terminal 64.

By including additional circuitry with the embodiment 10 of FIG. 1, modifications of its operation are achieved. In FIG. 7 a resonating capacitor 55 is connected across the entire inductor comprised of branches 26 and 36. When the power supply voltage at terminal 24 exceeds the threshold level A, a push-pull oscillator operation is achieved with sinusoidal wave 55 output. As is shown in FIG. 8, by including cross coupling resistor 56 between the anode of semiconductor region 16 and the input terminal 46 of electrical shock wave device 14, and coupling resistor 58 between the anode 34 of electrical shock wave device 14 and input terminal 44 of electrical shock wave device 12, a multivibrator is achieved with output pulse train 61 having a pulse width T.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An electrical shock wave apparatus comprising:

(a) first and second bulk semiconductor devices;

(b) each of said devices including a body of semiconductor material which is responsive to the application of an electric field above a threshold value to have nucleated and propagated therein a high field domain, said nucleation and propagation once initiated continuing as long as the field in the body is maintained above a domain extinction level;

(c) each of said bodies having first and second electrodes connected at separated points on the body;

(d) each of said bodies having a trigger terminal connected to the body at a point between the points at which said first and second electrodes are connected;

(e) voltage means connected to the electrodes on said bodies for applying a voltage across each of said bodies which voltage is less than that necessary to cause the threshold field to be exceeded in said bodies;

(f) each of said bodies being responsive when a signal is applied to the trigger terminal thereon to have nucleated therein a domain which propagates in the body;

(g) the voltage at one of the electrodes of each body being raised when a domain is nucleated and propagated in that body; and (h) means interconnecting the electrodes on said bodies for causing the voltage across one of said bodies to be lowered when the voltage across the other body is raised by the presence of a domain therein, whereby said other body is non-responsive to a signal applied to the trigger terminal thereon.

2. The apparatus of claim 1 wherein said means connecting the electrodes on said bodies comprises an inductive circuit.

3. The apparatus of claim 1 wherein said first and second devices are connected in parallel circuit relationship with respect to said voltage means.

References Cited

FOREIGN PATENTS 1,398,348 3/1965 France.

ARTHUR GAUSS, *Primary Examiner.*

J. ZAZWORSKY, *Assistant Examiner.*

U.S. Cl. X.R.

307—203, 217; 317—234; 331—113, 114, 107, 117